Sept. 14, 1943.   G. E. DATH   2,329,338
FRICTION SHOCK ABSORBING MECHANISM
Filed Nov. 5, 1941
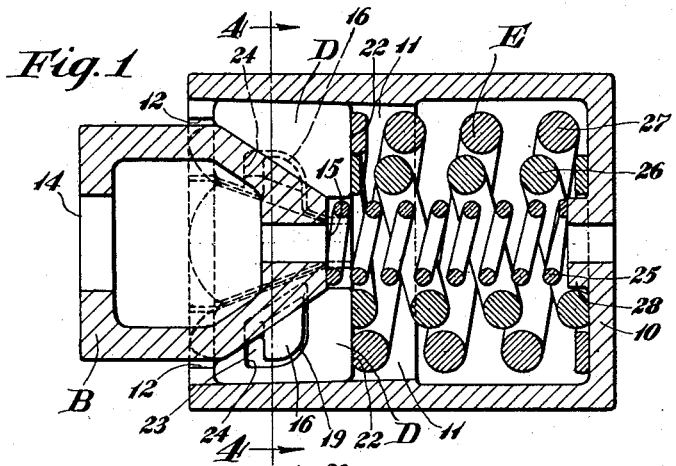
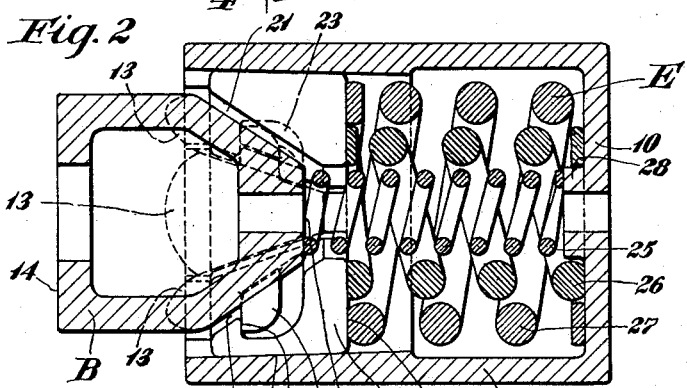
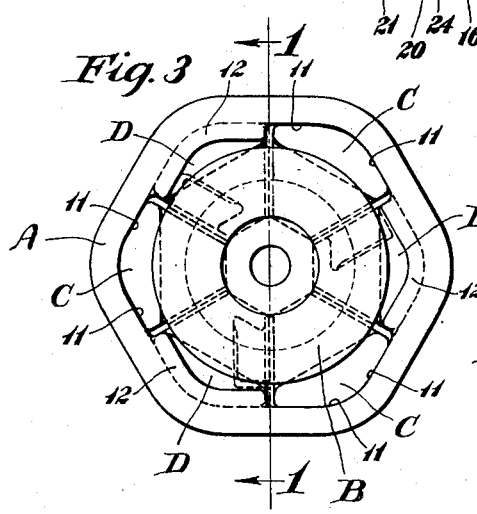
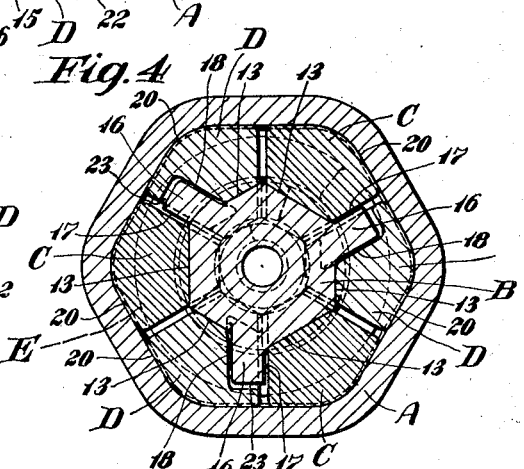
Inventor
George E. Dath
By Henry Fuchs
Atty.

Patented Sept. 14, 1943

2,329,338

UNITED STATES PATENT OFFICE 2,329,338

FRICTION SHOCK ABSORBING MECHANISM

George E. Dath, Mokena, Ill., assignor to W. H. Miner, Inc., Chicago, Ill., a corporation of Delaware Application November 5, 1941, Serial No. 417,899

7 Claims. (Cl. 267—9)

This invention relates to improvements in friction shock absorbing mechanisms.

The main object of the invention is to provide a friction shock absorbing mechanism comprising a friction casing closed at one end and having the other end open, a friction clutch, including a central wedge block and friction shoes surrounding the wedge block, and a spring resistance opposing movement of the clutch inwardly of the casing, wherein the spring resistance and clutch are insertable through the open end of the casing in assembling the parts, and the wedge and shoes are held assembled with the casing by shouldered engagement between the casing of certain of said shoes and between said last named shoes and the wedge block.

A more specific object of the invention is to provide a friction shock absorbing mechanism comprising a friction casing open at its front end only and having interior friction surfaces at its open end, a central wedge block, a plurality of friction shoes surrounding the wedge block and having sliding frictional contact with the casing friction surfaces, and spring means within the casing resisting inward movement of the shoes and wedge, wherein alternate shoes have shouldered engagement with inturned flanges on the casing to limit outward movement of said shoes, wherein the wedge is anchored to said alternate shoes by projecting lugs on the wedge, and wherein the remaining shoes, during the operation of assembling the gear, are displaceable inwardly of the casing against the resistance of the spring means, to an extent to provide clearance for the lugs on the wedge to permit insertion of the wedge between said alternate shoes and positioning of the same to bring the lugs thereof into anchoring relation with the alternate shoes.

Other objects of the invention will more clearly appear from the description and claims hereinafter following In the drawing forming a part of this specification, Figure 1 is a longitudinal sectional view through a friction shock absorbing mechanism illustrating my improvements, said view corresponding substantially to the line 1—1 of Figure 3. Figure 2 is a view similar to Figure 1 but showing the wedge block in a different position. Figure 3 is a front elevational view of Figure 1. Figure 4 is a transverse sectional view, corresponding substantially to the line 4—4 of Figure 1.

As shown in said drawing, my improved friction shock absorbing mechanism comprises broadly a casing A providing a combined friction shell and spring cage; a wedge B; six friction shoes C—C—C and D—D—D, the shoes D being alternated with the shoes C and having shouldered engagement with the wedge and casing to hold the parts of the mechanism assembled; and spring means E within the casing yieldingly opposing inward movement of the wedge shoes.

The specific friction shock absorbing mechanism disclosed in the drawing is of the type usually employed as a snubber in connection with truck springs of railway cars and Figure 1 shows the normal position assumed by the parts thereof when confined between the body and truck bolsters of the car. Figure 2 shows the condition of the mechanism when not confined between the bolsters.

The casing A is of substantially hexagonal interior and exterior cross section having the friction shell section at the forward end which is open, and the spring cage section at the rear end thereof. The casing A is closed at the rear end by a transverse wall 10 formed integral with the side walls of said casing. The friction shell section of the casing is provided with six interior, substantially flat friction surfaces 11 which converge inwardly of the casing and are spaced symmetrically about the central longitudinal axis of the mechanism. At the open end at alternate corners the casing A is provided with inturned stop flanges 12—12—12 which extend in opposite directions from each of said corners to points near the centers of the outer edges of the adjacent friction surfaces.

The wedge B is in the form of a block having six inwardly converging flat wedge faces 13 arranged symmetrically about the central longitudinal axis of the mechanism. At the outer end the block B has a flat transverse abutment face 14 adapted to receive the actuating force. At the inner end the block B terminates in a flat face 15 forming a spring abutment, as hereinafter pointed out. Projecting outwardly from alternate corners of the wedge are relatively thick retaining lugs 16—16—16. Each lug has one side face 17 thereof substantially in line with the corresponding corner of the wedge and radial to the central longitudinal axis of the same. The opposite side face 18 of the lug is parallel to the face 17 and meets the corresponding wedge face 13 at a point spaced from said corner. As shown most clearly in Figures 1 and 2 each lug 16 is located approximately midway between the front and rear ends of the corresponding wedge face 13 and has the rear face thereof rounded off, as indicated at 19.

The friction shoes C and D are of similar design, except as hereinafter pointed out. Each shoe has an outer friction surface 20 of V-shaped transverse contour engaging with portions of adjacent friction surfaces 11—11 at one of the corners of the casing. The portions of the surfaces 11—11 engaged by each shoe form, in effect, a V-shaped friction face. The casing is thus provided with six such V-shaped faces. The engaging portions of the surface 20 are correspondingly inclined to the cooperating surface portions 11—11. As will be seen upon reference to Figures 3 and 4, the six shoes are located at the six corners of the hexagonal casing, each shoe having the face portions thereof engaging slightly less than half the widths of the friction surfaces 11—11 at the corresponding corner. Each shoe C and D has a flat wedge face 21 on the inner side thereof, correspondingly inclined to and cooperating with one of the faces 13 of the wedge B. At the inner end each shoe has a flat end face 22 adapted to bear on certain of the springs of the spring resistance E.

The shoes D—D—D are alternated with the shoes C—C—C, and are located at the corners of the casing which are provided with the stop flanges 12—12—12 and are limited in their outward movement by engagement with said flanges. The shoes C—C—C are located at the corners of the casing which do not have stop flanges and are thus not restricted in their outward movement in the same manner as the shoes D—D—D. However, as will be evident, the shoes C—C—C will be limited in their outward movement by engagement with the wedge B. Each shoe D has a recess or pocket 23 opening through one side thereof, as shown in Figures 2 and 4, to receive the corresponding lug 16 of the wedge block, the wedge B being so disposed when the mechanism is completely assembled that the three lugs 16—16—16 thereof engage in the pockets 23—23—23 of the three shoes D—D—D. Each pocket 23 is of greater dimension in depth lengthwise of the mechanism than the thickness dimension of the corresponding lug 16, so that said lug has a certain amount of play in the pocket. At the front end, each pocket has a transverse end wall 24 forming a stop shoulder with which the corresponding lug 16 is adapted to engage. The rear wall of each pocket is preferably rounded, as shown.

The spring resistance E comprises three coils 25, 26, and 27, the coil 25 being centrally disposed and surrounded by the coil 26, which, in turn, is surrounded by the coil 27. The innermost coil 25 is relatively light and has its front and rear ends bearing respectively on the inner end face 15 of the wedge B and an inwardly projecting central boss 28 on the end wall 10 of the casing A. The coil springs 26 and 27 which surround the spring 25 bear at their front ends on the inner ends of the shoes C and D and have their rear ends bearing directly on the rear end wall of the casing. The springs 25, 26, and 27 are preferably under initial compression and, as shown in Figure 2, when the mechanism is completely assembled before application between the bolsters of a railway car, the springs 26 and 27 hold the shoes D in their outermost position limited by their shouldered engagement with the stop flanges 12 of the casing, and the spring 25 holds the wedge in its outermost position with the lugs 16—16—16 thereof in shouldered engagement with the stop shoulders 24—24—24 of the shoes D—D—D. The wedge B is thus anchored to the shoes D—D—D which in turn are anchored to the casing, thereby holding all of the parts of the mechanism assembled. As will be evident, when the mechanism is in the condition shown in Figure 2, the shoes C—C—C loosely rest against the springs 26 and 27 and are free to move outwardly until the wedge faces thereof engage the wedge faces of the wedge block B, but are blocked against sliding or falling out of the casing by engagement with said wedge block.

In assembling the mechanism the springs 26 and 27 and the shoes C and D are first placed within the casing by inserting the parts through the open front end of the latter. With the wedge B absent, the group of shoes C and D may be contracted so that the three shoes D—D—D will clear the flanges 12—12—12 of the casing A and pass freely into the friction shell end of the latter. After the shoes composing the group have been spread apart to bring the shoes D—D—D in back of the stop flanges 12—12—12, the three shoes C—C—C are forced inwardly until the front ends of the same are disposed a distance rearwardly of the stop faces 24—24—24 of the shoes D—D—D, which is greater than the thickness of the lug 16 of the wedge B, and held in that position while the wedge B is being assembled with the other parts. The spring 25 and the wedge B are then assembled with the other parts. In applying the wedge B the same is turned to a position wherein the lugs 16—16—16 thereof are disposed in front of the shoes C—C—C, that is, in the spaces between the shoes D—D—D. The wedge B is then pushed inwardly until the lugs 16—16—16 are disposed a slight distance rearwardly of the stop faces 24—24—24 of the shoes D—D—D. After being brought to this position the wedge is given a clockwise turn, as viewed in Figure 4, engaging the lugs 16—16—16 within the pockets 23—23—23 of the shoes D—D—D and bringing said lugs into aligned position with, and in back of, the stops 24—24—24, thereby anchoring the wedge to said shoes and limiting outward movement of the same. After the parts have been thus completely assembled the shoes C—C—C are released, permitting the same to be projected forwardly by the springs 26 and 27 until the front ends of these springs also contact the inner ends of the shoes D—D—D. When the shoes C—C—C are in the projected position referred to, which is the normal position, they lock the wedge against rotation by blocking lateral displacement of the lugs 16—16—16.

The operation of my improved shock absorbing mechanism is as follows: Upon inward movement of the wedge B with respect to the casing A being produced due to the compression of the mechanism, the spring resisted friction shoes are wedged apart and carried inwardly of the mechanism compressing the spring resistance E, the springs 26 and 27 being directly compressed by the shoes and the spring 25 by the wedge B. High frictional resistance is thus produced between the friction surfaces of the shoes and casing. Upon the actuating force being reduced the expansive action of the spring resistance E returns all of the parts to the normal position shown in Figure 1. It is further pointed out that when the friction shock absorbing mechanism is removed from between the bolsters of the car the same is free to expand to its full extent, as shown in Figure 2, outward movement of the shoes D—D—D being limited by shouldered engagement with the casing flanges, and outward movement of the wedge B being limited by shouldered engagement of the lugs thereof with the shoulders of the shoes D—D—D.

Although the friction shock absorbing mechanism herein disclosed has been shown and described as employed in connection with truck springs of a railway car as a snubbing device for the springs, it will be evident that the same is not limited to such use but may be employed as a shock absorber wherever such device is required as, for example, in a railway draft rigging.

I have herein shown and described what I now consider the preferred manner of carrying out my invention, but the same is merely illustrative and I contemplate all changes and modifications that come within the scope of the claims appended hereto.

I claim:

1. In a friction shock absorbing mechanism, the combination with a friction casing open at one end and closed at the other end, said casing having interior friction surfaces at said open end; an annular series of friction shoes cooperating with said friction surfaces, alternate shoes of said series having shouldered engagement with the casing to limit outward movement of said shoes; a wedge block having wedging engagement with the shoes, said wedge block having radial lugs in shouldered engagement with said alternate shoes to hold said wedge against outward movement; and a spring within the casing opposing inward movement of the shoes.

2. In a friction shock absorbing mechanism, the combination with a friction casing open at the front end and closed at its rear end, said casing having interior friction surfaces at said open end, said casing having inturned spaced flanges at said open front end; of a plurality of friction shoes, alternate shoes of which have shouldered engagement with said flanges to limit outward movement of said alternate shoes; a wedge block having wedge faces, said block having laterally outwardly projecting lugs corresponding in number to said alternate shoes and having shouldered engagement therewith to limit outward movement of the wedge, said wedge being rotatable about its longitudinal axis to bring the lugs thereof into and out of registration with the shoulders of said alternate shoes; and means within the casing yieldingly opposing inward movement of the shoes and wedge.

3. In a friction shock absorbing mechanism, the combination with a friction casing open at its front end and closed by a transverse wall at the rear end, said casing having interior friction surfaces at said open end and a plurality of inturned retaining lugs at the front end of said friction surfaces; of a wedge block having wedge faces; shoes interposed between the wedge and shell friction surfaces and having wedge faces engaging the wedge faces of said block, alternate shoes having shouldered engagement with said lugs to limit outward movement of the same, said wedge block having laterally outstanding lugs having shouldered engagement with said alternate shoes to limit outward movement of the wedge block; and a spring within the casing interposed between the shoes and the rear wall of the casing, said spring yieldingly resisting movement of the shoes.

4. In a friction shock absorbing mechanism, the combination with a friction casing open at the front end and closed by a transverse wall at the rear end, said casing having interior friction surfaces at said open end, said casing having a plurality of circumferentially spaced inturned retaining flanges at said open end; of a wedge block having a plurality of outwardly extending retaining lugs corresponding in number to the flanges of the casing; a plurality of friction shoes interposed between the wedge block and casing friction surfaces, said block and shoes having cooperating wedge faces, certain of said shoes having pockets within which the lugs of said wedge block are engaged to anchor the wedge to said shoes, the shoes provided with pockets corresponding in number to the lugs of the wedge and having shouldered engagement with the respective flanges of the casing to limit outward movement of said shoes; and a spring within the casing yieldingly resisting movement of the shoes inwardly of the casing.

5. In a friction shock absorbing mechanism, the combination with a hexagonal friction casing open at the front end, said casing having six interior friction surfaces, said casing having three inturned retaining flanges at the open end thereof, said flanges being disposed respectively at alternate corners of the casing; of six friction shoes, each of said shoes engaging adjacent friction surfaces of said casing at the corners of said casing, the shoes at said alternate corners of the casing having their outward movement limited by engagement with said flanges of the casing, all of said shoes having wedge faces on their inner sides; a wedge block having three retaining lugs engaged with said shoes at said alternate corners of the casing to limit outward movement of the wedge, said wedge and shoes having cooperating wedge faces; and spring means within the casing opposing inward movement of the shoes.

6. In a friction shock absorbing mechanism, the combination with a friction casing open at the front end and having six V-shaped interior friction faces at said front end arranged symmetrically about the longitudinal central axis of the casing, said casing having inturned retaining lugs at said front end at alternate friction faces; of a friction shoe cooperating with each of said V-shaped casing faces, each shoe having a wedge face on its inner side, the shoes cooperating with said alternate faces having their outward movement limited by engagement with said lugs, each of said last named shoes having a stop shoulder thereon; a wedge block having wedge faces respectively engaging said shoe wedge faces, said block having radially outwardly projecting retaining lugs cooperating with said stop shoulders of said shoes to limit outward movement of the block; and means within the casing yieldingly opposing inward movement of the shoes.

7. In a friction shock absorbing mechanism, the combination with a friction casing open at the front end, said casing having interior friction faces; of a friction clutch including a wedge block and cooperating friction shoes, one of said shoes having a pocket opening through the side thereof, said wedge block having a laterally extending lug, the shoe of said clutch which is adjacent the shoe provided with the pocket and located at the side of said last named shoe which has the pocket, being inwardly displaceable with respect to said pocketed shoe to provide clearance for the lug of the wedge while said shoe is displaced to permit insertion of said wedge within the casing, said wedge block being rotatable to engage the lug thereof within said pocket and anchor the wedge to said pocketed shoe; and spring means yieldingly opposing inward movement of the clutch.

GEORGE E. DATH.